(12) United States Patent
Olofsson

(10) Patent No.: US 11,780,543 B2
(45) Date of Patent: Oct. 10, 2023

(54) DEVICE FOR CONTROLLING PITCH, ROLL AND/OR STEERING OF A BOAT

(71) Applicant: PREZIP TECHNOLOGY AB, Vänersborg (SE)

(72) Inventor: Niclas Olofsson, Lidköping (SE)

(73) Assignee: PREZIP TECHNOLOGY AB, Vänersborg (SE)

( * ) Notice: Subject to any disclaimer, the term of this patent is extended or adjusted under 35 U.S.C. 154(b) by 257 days.

(21) Appl. No.: 17/281,447

(22) PCT Filed: Oct. 2, 2019

(86) PCT No.: PCT/SE2019/050954
§ 371 (c)(1),
(2) Date: Mar. 30, 2021

(87) PCT Pub. No.: WO2020/071988
PCT Pub. Date: Apr. 9, 2020

(65) Prior Publication Data
US 2022/0001964 A1    Jan. 6, 2022

(30) Foreign Application Priority Data
Oct. 5, 2018 (SE) .................................. 1851212-9

(51) Int. Cl.
*B63B 39/06* (2006.01)
*B63H 25/44* (2006.01)
*B63B 1/32* (2006.01)

(52) U.S. Cl.
CPC .......... *B63B 39/061* (2013.01); *B63H 25/44* (2013.01); *B63B 2001/325* (2013.01)

(58) Field of Classification Search
CPC ... B63B 39/061; B63B 2001/325; B63B 1/18; B63H 25/44; Y02T 70/10
See application file for complete search history.

(56) References Cited

U.S. PATENT DOCUMENTS 8,622,012 B2 * 1/2014 Olofsson ............... B63B 39/061
                                                    114/284
9,032,898 B2 * 5/2015 Widmark ................. B63B 1/32
                                                    114/284
(Continued)

FOREIGN PATENT DOCUMENTS

CN      101327835 A    12/2008
CN      102941912 B    11/2015
(Continued)

OTHER PUBLICATIONS

International Search Report, issued in PCT/SE2019/050954, dated Nov. 22, 2019.
(Continued)

*Primary Examiner* — Anthony D Wiest
(74) *Attorney, Agent, or Firm* — Birch, Stewart, Kolasch & Birch, LLP

(57) ABSTRACT

A device for controlling pitch, roll and/or steering of a boat, ship or vessel has a length direction and a height direction and includes at least two actuators, at least two actuating means, at least two crankshafts and an interceptor member. Each actuator is adapted to interact with the corresponding actuating means. The actuating means are adapted to interact with the interceptor member, such that the interceptor member is linearly displaceable between a retracted and an extracted position. Each actuating means is adapted to interact with the corresponding crankshaft, which thereby rotates. The crankshafts interact with the interceptor member such that rotations of the crankshafts consequently lead to a displacement of the interceptor member between the retracted and the extracted position. A boat, ship or vessel include the device.

20 Claims, 8 Drawing Sheets

(56) References Cited

U.S. PATENT DOCUMENTS

2011/0017115 A1  1/2011  Olofsson
2014/0318432 A1  10/2014  Wendels

FOREIGN PATENT DOCUMENTS

| EP | 1 075 415 A1 | 2/2001 |
|---|---|---|
| EP | 1 092 624 A2 | 4/2001 |
| EP | 2 703 279 A1 | 3/2014 |
| EP | 2 776 313 B1 | 10/2016 |
| RU | 2 612 941 C1 | 3/2017 |
| WO | WO 99/55577 A1 | 11/1999 |

OTHER PUBLICATIONS

Written Opinion of the International Searching Authority, issued in PCT/SE2019/050954, dated Nov. 22, 2019.

* cited by examiner

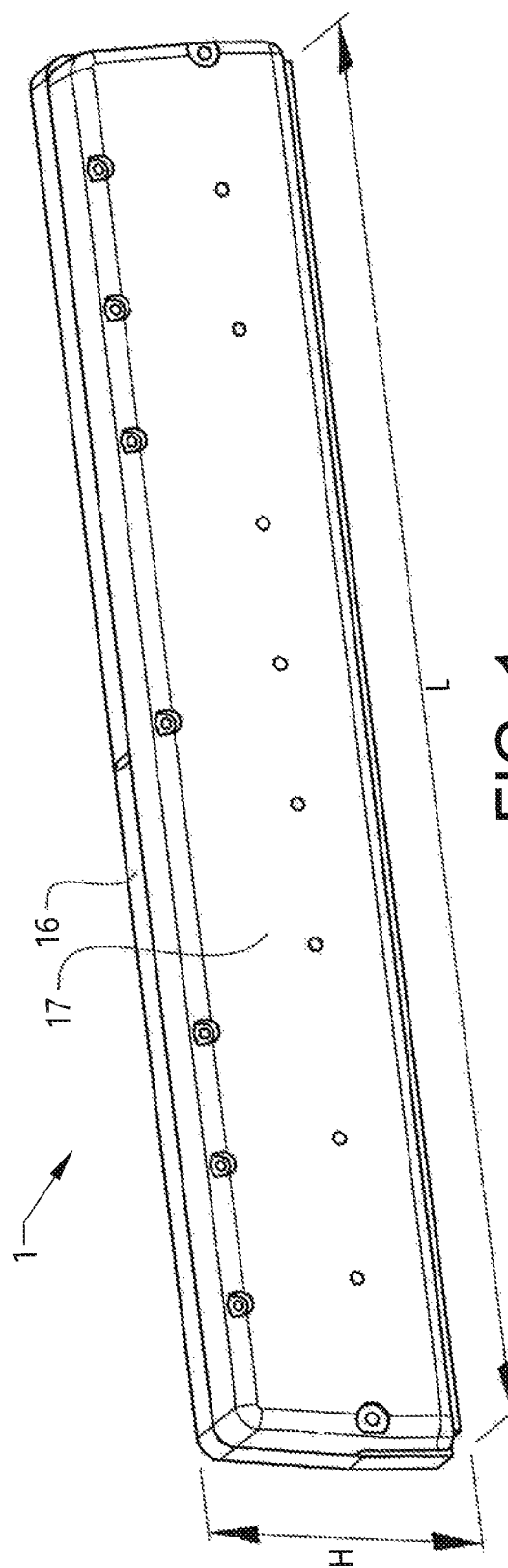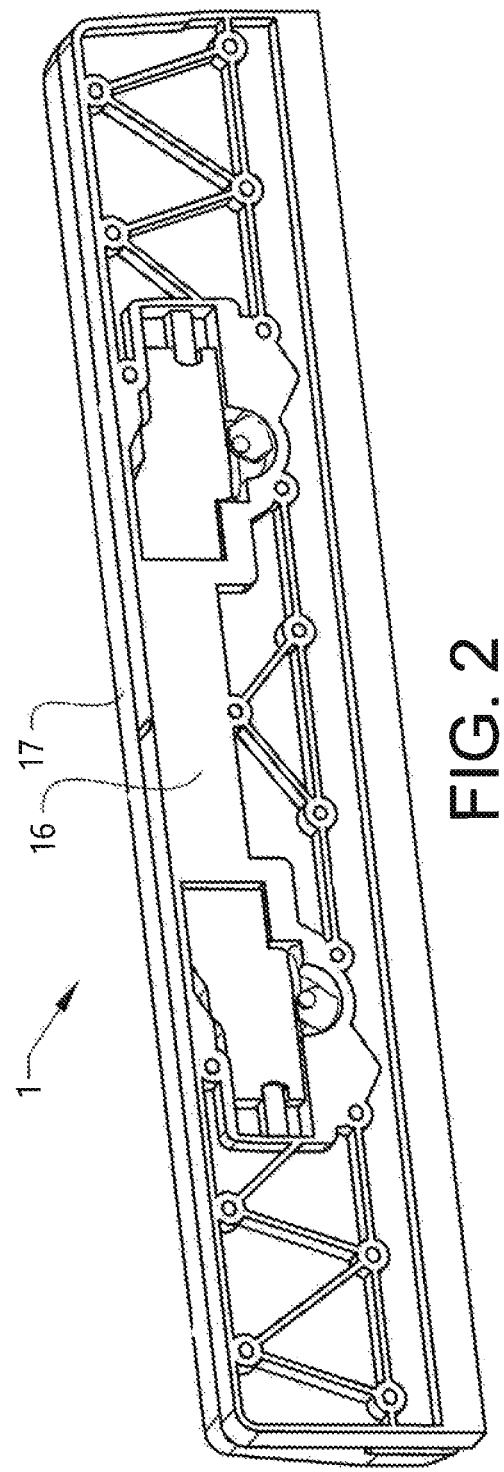

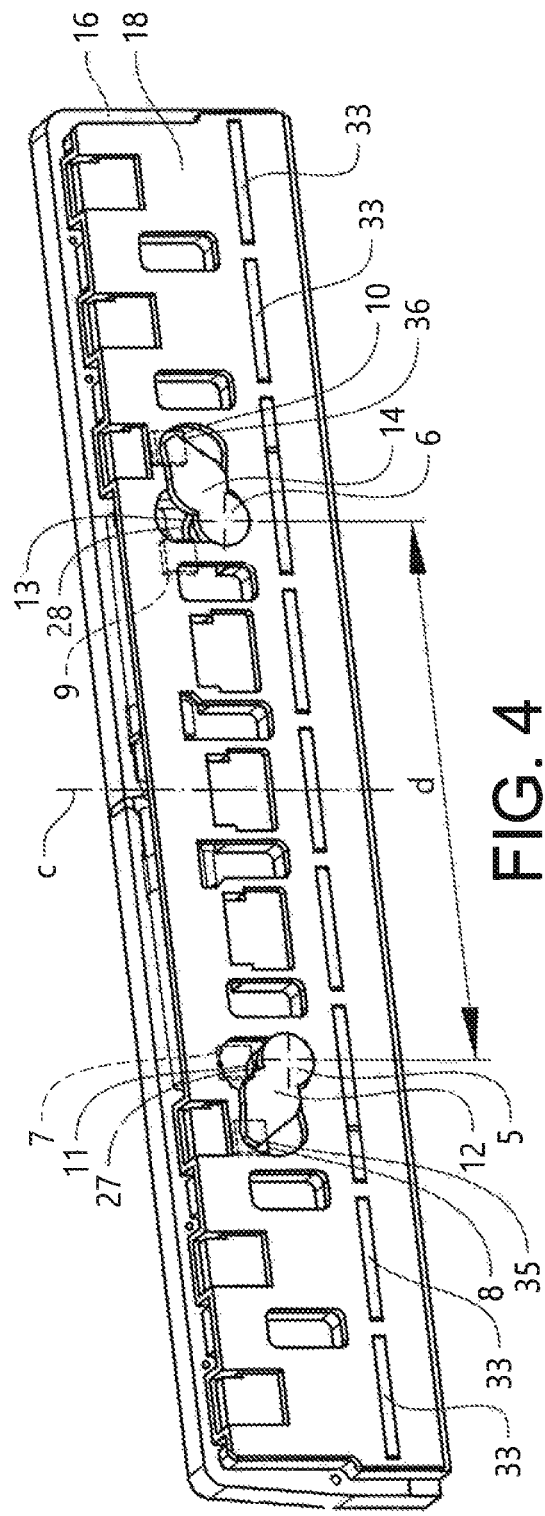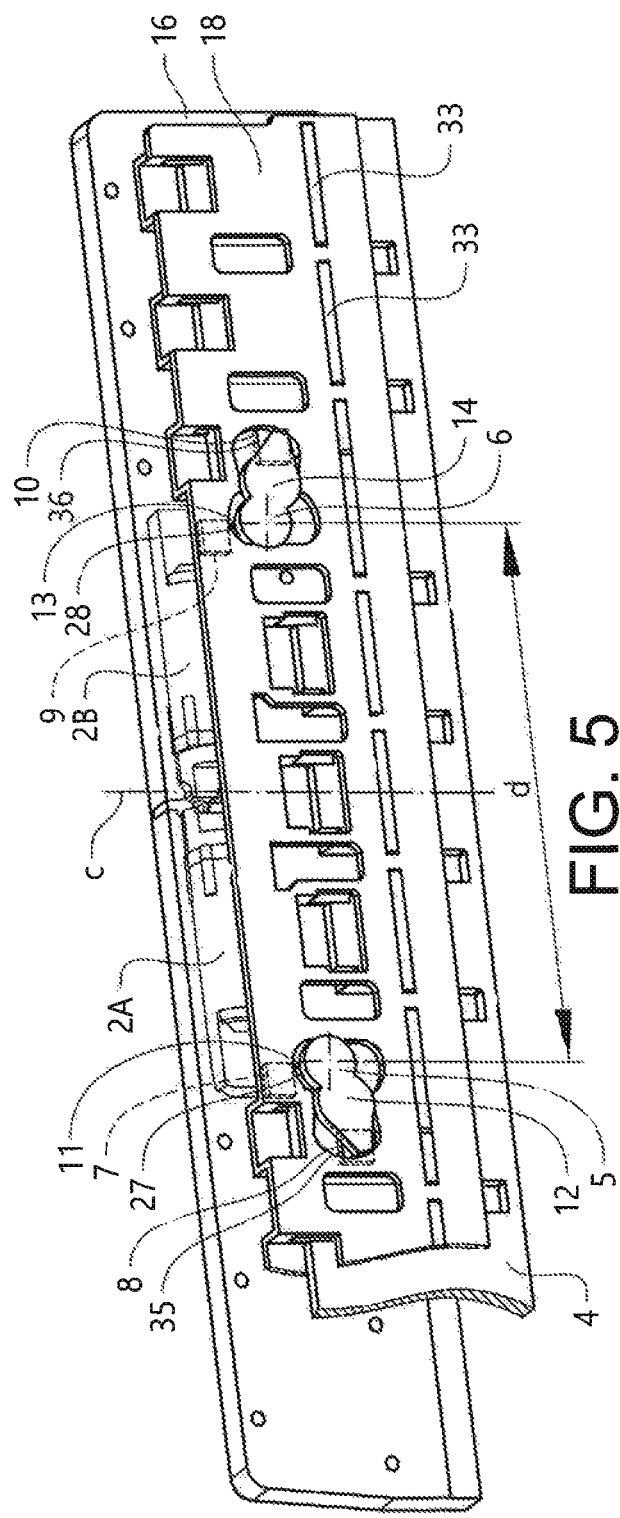

DEVICE FOR CONTROLLING PITCH, ROLL AND/OR STEERING OF A BOAT

TECHNICAL FIELD

The disclosure pertains to a device for dynamically controlling a running pitch, roll and/or steering of a boat having at least one hull with a stern. The device comprises at least two actuators, transmission means and an interceptor member. The interceptor member is linearly displaceable in relation to other parts of the device. Further, the device is adapted to be attached to the hull of the boat. The device is applicable for dynamically controlling the running pitch, roll and/or steering of boats, ships or any large vessel or watercraft. The device is especially applicable for planning or semi-planning boats.

BACKGROUND ART

A number of devices that are used for dynamically controlling the running trim, i.e. pitch and roll, and steering of a boat are known in the art. Most common are trim tabs or trim flaps. Interceptors become however more and more common. These interceptor devices generally have an interceptor member, an actuator and a power supply means. The interceptor can be arranged directly on the boat hull or in a housing. Commonly the actuator acts upon the interceptor member to linearly displace it in water for dynamically controlling the running trim and steering of the boat. Further, to attain the desired trim and steering control/effect the interceptor member is accordingly displaced to a suitable level in water.

In order to provide sufficient power to suitably displace the interceptor member in water, multiple actuators or a single large actuator is used. One known arrangement is disclosed in EP 1 075 415, and having a single large actuator, which is provided to displace the interceptor member. The interceptor member is constructed as a "T" shaped body and therefore has both vertical and horizontal sections with respect to the actuator. The vertical section of the interceptor member is the one connected to the actuator and acts as guiding means for the interceptor member. The usage of such guiding means is needed to achieve the sufficient stability to assure a linear movement of the interceptor member during operation. Further, the guiding means itself is subject to frictional forces during operation. In order to overcome these frictional forces, stronger actuators and/or possibly also bearings along the sides of the guide is required. The usage of a strong actuator makes the device more expensive, heavy and large. Further, the usage of extra bearings increases the manufacturing cost and the maintenance cost of the device.

Further, in case of devices having multiple actuators or multiple components/parts, the task of assembling these devices is cumbersome. Multiple actuators are placed outside the device body due to space and size constraints. A mounting of a plurality of actuators together with interceptor members demands an abundance of attachment means and thereby mostly undesired damage to the transom of the hull of the boat. It is desired to keep the hull as undamaged under the waterline as possible.

Furthermore, a boat owner considering replacing an existing device of such kind with a newer version may find it very difficult to do so. This is so because the preformed grooves etc. required for one device may not be compliant with the newer device. This scenario will also arise in case the existing device is totally damaged/non-functional and needs replacement.

In light of the above discussion, there is a need for a new and improved interceptor assembly which will overcome the problems associated with the existing products and provide a compact, reliable device that is easy to assemble on the hull of the boat.

In EP2776313 a device for controlling trim, i.e. pitch and roll, and/or steering of a boat, ship or vessel is disclosed which addresses problems associated with the existing products. However, there is still a continuing need for alternative devices for controlling trim, i.e. pitch and roll, and/or steering of a boat, ship or vessel.

SUMMARY

Among others the object of the present disclosure is to provide a device for dynamically controlling pitch, roll and/or steering of a boat, ship or vessel. It is desired that the device is a compact, reliable device that is easy to assemble and mount on the outside of the hull of the boat.

The disclosure relays upon the idea to use transmission mechanisms, i.e. transmission means, between at least two actuators and interceptor member in order to enhance the displacement force upon the interceptor member. The transmission mechanisms are constructed such that they cancel out the side forces upon the interceptor member, such that it thereby can move between its retracted and extracted position, without any guiding means and without getting skew, simultaneously as the device stays compact.

The device, for controlling pitch, roll and/or steering of a boat, ship or vessel, has a length direction and a height direction and comprises at least two actuators, at least two actuating means, at least two crankshafts and an interceptor member,
wherein each actuator is adapted to interact with the corresponding actuating means,
wherein the actuating means are adapted to interact with the interceptor member such that the interceptor member is linearly displaceable between a retracted and an extracted position,
wherein each actuating means is adapted to interact with the corresponding crankshaft, which thereby rotates, and
wherein the crankshafts interact with the interceptor member such that rotations of the crankshafts consequently lead to a displacement of the interceptor member between the retracted and the extracted position,
wherein the actuating means have a linear movement which are directed perpendicular relative the movement of the interceptor member and opposite directed relative each other.

Exemplary effects of the device is that the design of the transmission mechanisms allows for scale up of the devices application area (i.e. to larger boats), with a relative small scaling up of size of the device itself, e.g. constituents, such as, needed actuator space, cables, holes in device and hulls, can be limited. This is achieved by that the device comprising at least two actuators, each actuator with its own transmission mechanisms, whereby, any cabling of the device with the at least two actuators can, for example, be kept at dimensions relatively smaller than with a device of a corresponding size but with only one larger actuator that achieves the same output power as the at least two actuators. Furthermore, the device, in accordance with the present disclosure, also allows for the readily use of actuators being of the same type in smaller devices having the power need of only one actuator.

Further exemplary effect of the combined features of the device, is that a device with essentially zero side forces is realised, due to the arrangement of opposite directed movements of the actuating means relative each other.

In an exemplary embodiment of the device, the displacement of the interceptor member between the retracted and the extracted position is executed substantially in the height direction of the device.

In a further exemplary embodiment of the device, the interceptor member is continuously and linearly displaceable between a retracted and an extracted position.

In a further exemplary embodiment of the device, the at least two actuators are arranged essentially symmetrically about the centre of the device length direction, and of the interceptor member.

In an exemplary embodiment, the length direction of the actuator is parallel with the length direction of the device and thereby with the interceptor member.

In an exemplary embodiment, the length direction of the actuator is parallel with the direction of the linear movement of the actuating means.

In a further exemplary embodiment of the device, the device comprises means for limiting friction between components of the device and/or parts of the device that move in relation to each other during the function of the device.

The means for limiting friction between components of the device and/or parts of the device may include, for example, rollers, and/or sliding means (e.g. sliding surfaces and/or sliding shoes).

In a further exemplary embodiment of the device, the device comprises a back housing part and a front housing part wherein the back housing part and the front housing part together forms, or together at least partly forms, a device housing and the at least two actuators are placed inside the device housing.

In a further exemplary embodiment of the device, the device housing may be a closed, or a partly open, housing. Moreover, both the back and front housing parts may each separately be comprised of one or more parts. Further, the housing may, besides the back and front housing parts, also comprise other parts, e.g. other housing parts. Furthermore, the feature that "the back housing part and the front housing part together are comprised in a device housing and the at least two actuators are placed inside the device housing" does also comprise embodiments wherein, for example, any actuator housing part, or any actuator housing parts, is/are also comprised in, and forming part of, the device housing.

In a further exemplary embodiment of the device, the device comprises rollers that are arranged in-between, and to act as bearings between, the interceptor member and other components of the device, e.g. a back-housing part of the device and/or a front housing part of the device.

In a further exemplary embodiment of the device, the at least two actuating means, are continuously linearly displaceable and are adapted to interact with the at least two crankshafts. The at least two actuating means can be a first and a second actuating means and the at least two crankshafts can be a first and a second crankshaft. A linear displacement of the at least two actuating means cause rotations of the at least two crankshafts, additionally, the at least two crankshafts are arranged such relative each other and the actuating means that the crankshafts rotate in opposite directions relative each other, when the at least two actuating means act thereon. The at least two crankshafts interact with the interceptor member upon rotation and consequently causes the displacement of the interceptor member between the retracted and the extracted position.

The at least two actuating means and the at least two crankshafts are arranged so that a translational motion of each of the actuating means is transferred to a rotary motion of the corresponding crankshaft The actuators can be any type of actuator, such as any type of electrical actuators, such as an electric motor. Commonly an electrical actuator has an output shaft that rotates. In order to convert the rotational motion of the output shaft to a translational motion, the output shaft comprises a lead screw provided with a continuous thread. The thread acts upon a bolt or the like, whereby the bolt will be linearly displaced along the lead screw upon rotation of the drive shaft. Alternative solutions may comprise. worm gear arrangement, to allow an angled assembly between drive shaft and actuating means.

The rotary motion of the corresponding crankshaft is, or may suitably be, transferred to a translational displacement of the interceptor member. Further, the translational displacement of the interceptor member is, or may suitably be, essentially in the height direction of the device.

In an exemplary embodiment of the device, the device comprises an even number, e.g. two, of actuators, of actuating means and of crankshafts, and wherein a first half of crankshafts, e.g. a first crankshaft, and a second half of crankshafts, e.g. a second crankshaft, are arranged such relative each other that they rotate in opposite directions when the corresponding actuating means act thereon. The crankshafts, for example, a first half of crankshafts and a second half of crankshafts, e.g. the first crankshaft and the second crankshaft, rotate in opposite directions.

An exemplary effect thereof is that the side forces from the crankshafts equal each other out, whereby an improved force stability is achieved.

In an exemplary embodiment of the device, the motion of each of the actuating means is essentially perpendicular to the motion the interceptor member. Further, in further embodiments, the device may comprise an even number, e.g. two, of actuating means, and wherein the motion of a first half of actuating means, e.g. the first actuating means, is opposite the motion of a second half of the actuating means, e.g. the second actuating means.

In an exemplary embodiment of the device, the device comprises an even number, e.g. two, of actuators, actuating means and crankshafts, and wherein a second half of the actuator means, e.g. a second actuator means, are mirrored placed to a first half of the actuators means, e.g. a first actuator means. Further in this embodiment, the second half of the crankshafts, e.g. a second crankshaft, is, or may be, rotating in opposite direction to the first half of the crankshafts, e.g. a first crankshaft, when acted on by the corresponding actuating means.

In an exemplary embodiment of the device, the device comprises an even number, e.g. two, of actuators, actuating means and crankshafts, and wherein a second half of the actuators, e.g. a second actuator, are either rotated 180°, or mirrored placed, to a first half of the actuators, e.g. a first actuator, and a second half of the actuating means, e.g. a second actuating means, is mirrored placed to a first half of the actuating means, e.g. a first actuating means, and the crankshafts thereby rotate in opposite directions to each other when acted on by the corresponding actuating means.

In an exemplary embodiment of the device, the device comprises an even number, e.g. two, of actuators, actuating means and crankshafts, and wherein a second half of the actuators, e.g. a second actuator, is rotated 180° to a first half of the actuators, e.g. a first actuator.

The feature "rotated 180°" suitably means herein that the placement of the "first half of the actuators, e.g. actuator" can be described as rotation of the "second half of the actuators, e.g. actuator" around a line approximately perpendicular to both the length direction and the height direction of the device. Further, the wording "rotated 180°" is also meant to comprise embodiments wherein the actuators are "rotated about 180°". Furthermore, by "mirrored placed" is meant a reflection of the "first half of the actuators, e.g. actuator" with respect to an axis going in the height direction. Here the wording "mirrored placed" is also meant to comprise embodiments wherein the actuators are "approximately mirrored placed".

In an exemplary embodiment of the device, the device comprises an even number, e.g. two, of actuators, actuating means and crankshafts, and wherein a second half of the actuators, e.g. a second actuator, is similar to, for example, substantially identical to, e.g., identical to, the first half of the actuators, e.g. the first actuator.

In an exemplary embodiment of the device, the device comprises two actuators, actuating means and crankshafts, and wherein the second actuator is rotated 180° to the first actuator and wherein the second actuator is similar to, for example, substantially identical to, e.g., identical to, the first actuator.

In an exemplary embodiment of the device, the device comprises an even number, e.g. two, of actuators, actuating means and crankshafts, and wherein a first half of the actuators, e.g. actuator, is arranged essentially symmetrically to a second half of the actuators, e.g. a second actuator, about a centreline in the height direction to the device.

In an exemplary embodiment of the device, the device comprises means for limiting friction between components of the device and/or parts of the device that move in relation to each other during the function of the device. The "means for limiting friction" is as described herein.

In an exemplary embodiment of the device, the device comprises rollers that are arranged in-between, and to act as bearings between, the interceptor member and other components of the device. Herein "to act as bearings between" may mean to take up forces in every suitable direction.

In some exemplary embodiments herein the "other components of the device" comprises, or may comprise, e.g. a back-housing part and/or a front housing part.

In an exemplary embodiment of the device, the device is provided with sliding surfaces between movable components of the device, for example, between the actuating means and other components of the device.

Further, the sliding surfaces may be comprised in the device between the actuating means and other components of the device, e.g. a back-housing part and/or a front housing part. Further, the sliding surfaces may suitably, e.g., be provided on the actuating means and/or on the other components of the device. Moreover, the sliding surfaces may further also be comprised in, e.g. sliding components, for example, sliding shoes, e.g. with, for example, receiving grooves or similar.

In an exemplary embodiment of the device, the at least two actuators are electric actuators.

In an exemplary embodiment of the device, the at least two crankshafts, e.g. a first and a second crankshaft, are further arranged such that they interact upon the interceptor member on essentially the same height, i.e. distance from the interceptor member's lower edge, wherein the lower edge is the edge adapted to act in the water.

Essentially the same height is defined such that the lowest point of an interaction surface between the highest placed crankshaft and the interceptor member never is above the highest point of the lowest positioned placed crankshaft.

The at least two crankshafts, e.g. a first and a second crankshaft, are, for example, arranged such that they interact upon the interceptor member on essentially the same distance to a centreline of the length of the interceptor member, i.e. approximately also to a centreline of the length of the device.

Essentially the same distance to the centre line has the same tolerances as the height position of the interceptor member, i.e. as "essentially the same height" as defined herein.

In an exemplary embodiment of the device, the interceptor member is continuously and linearly displaced and the displacement is perpendicular to the length direction of the interceptor member.

The length direction of the interceptor member, as described herein, also essentially coincides with the length direction of the device of the present disclosure.

The rotations of crankshafts, e.g. the first and of second crankshaft, in the opposite directions give the exemplary effect that the side forces acting on the interceptor member are essentially equally large and thus cancel each other out. Thus, it will thereby, in such an embodiment, be no need for guiding means as it is known in the prior art, to keep the interceptor member from wedging due to skewness of force distribution in the guiding means. Since no guiding means is needed the frictional force acting on the interceptor member decreases. Further, as the side forces subjected on the interceptor member by the crankshafts are directed in opposite directions and thereby cancel each other out and the crankshafts provide the side support. The interceptor member is stabilised, and no additional side support is needed. Further advantages are that the frictional forces decrease whereby smaller actuators can be used. The usage of smaller actuators decreases the power consumption of the device and also lowers the cost for production of the device and obviously makes the device compact, wherein it fits on the space left on the transom stern of the boat.

The crankshafts are adapted to interact with the interceptor member, such that the side forces caused by the rotation of the crankshafts are parallel to the length direction of the interceptor member and thereby cancel each other out. This will stabilise the interceptor member, wherein the use of a guiding means becomes excessive. It is thereby advantageous that the at least two crankshafts, e.g. the first and the second crankshaft, are arranged on a distance to each other in the length direction of the interceptor member. For example, the at least two crankshafts, e.g. the first and second crankshaft, interact upon the interceptor member on the same height of the interceptor member, this is however not always beneficial in order achieve a high density construction of the device and also not always necessary in order to achieve the desired effect. As long as the height of the interaction area between the cranks and the interceptor member overlap each other, a sufficient force cancellation of the side forces will take place.

Suitable crankshafts, i.e. the at least two crankshafts, are each provided with a central shaft, and wherein the central shaft is provided with a first and a second crank in each end of the central shaft, wherein each of the first cranks interacts with a corresponding actuating means and each of the second cranks interacts with the interceptor member, wherein all first and second cranks are displaced relative each other.

The first and the second crank are advantageously displaced with about a quarter of a revolution relative each other. Such a configuration of the first and second cranks on the central shaft enables that the displacements of each actuating means are perpendicular to the displacement of the interceptor member. Other relation between the first and the second crank is possible, whereby the displacements of each actuating means thereby will be in a different angle to the displacement of the interceptor member. Having displacements of each of the actuating means, parallel to the length direction of the device, is convenient, because the actuators can thereby also be placed lengthwise in the device and the mechanism to transmit the rotating movements of the actuators to the linear movements of the corresponding actuating means with a screw connection. This also enables a lengthwise arrangement of the actuators, enabling it to fit within a housing of the device.

Further, the crankshafts are arranged in the device such, that the respective second cranks move in the direction of the displacement of the interceptor member essentially synchronously with the other. This synchronised movement of the crankshafts does not cause any skew movement while the crankshafts are moving and thus prevents the interceptor member from getting stuck or jammed.

Furthermore, the first cranks are provided with corresponding first sliding shoes. The first sliding shoes are adapted to slide in corresponding grooves in the corresponding actuating means. The arrangement of the sliding shoes in the corresponding grooves decreases the friction between the crankshaft and the corresponding actuating means as there is no rotary motion between them.

Furthermore, the second cranks are provided with corresponding second sliding shoes. The second sliding shoes are adapted to slide in corresponding grooves in the interceptor member. The arrangement of the sliding shoes in the corresponding grooves decreases the friction between the crankshaft and the interceptor member as there is no rotary motion between them.

By using sliding shoes adapted to slide in grooves in respective interaction party (corresponding actuating means and interceptor member) side forces causing the interceptor member to rotate are effectively cancelled out. It is essential that the respective sliding shoes acting upon the interceptor member acts at least partially at the same height on the interceptor member. That is the lowest point of the height positioned sliding shoe never is above the highest point of the lowest positioned sliding shoe.

In an exemplary embodiment of the device, the actuating means are displaceable in a direction perpendicular to the direction of the displacement of the interceptor member. Such an arrangement facilitates an optimal force distribution.

In an exemplary embodiment of the device, the device is provided with housing, in which the at least two actuators, the at least two actuating means and the interceptor member are arranged, whereby the interceptor member is positioned at least partially outside the housing in its extracted position and positioned, or mainly positioned, inside the housing in its retracted position.

In an exemplary embodiment of the device, the housing comprises a back plate and a front plate and wherein the actuating means, the crankshafts and the interceptor member are arranged in-between the back and the front plate. The provision, of the back plate and the front plate forming the housing, encloses the device and also protects the device. Further, the device can be mounted on to the boat hull through the back plate.

In an exemplary embodiment of the device, the back plate of the device is provided with a lip/seal, which extends perpendicular to the displacement of the interceptor member and the lip/seal is adapted to seal between the back plate and the interceptor member. The lip/seal protects the device from the high pressure that occurs on the back of the device. The lip/seal also acts as a scraper and scrapes off any dirt or marine growth, e.g. barnacles that are attached to the interceptor member. Thus, the lip/seal increases the lifecycle of the whole device by protecting it from unnecessary wear caused by high pressure and contaminations.

Further, the actuators are, for example, mounted in between the back and the front plate in the device. The actuators are, for example, submersible. Due to the inventive device, which enables the use of smaller actuators then for previously known devices, the actuators can be provided within the housing (in between the front and the back plate) of the device, without the housing becoming unjustifiably large.

Rollers can be arranged in-between the interceptor member and the front and the back plate, in order to decrease the friction, there between.

A holding member is advantageously mounted on the interceptor member, wherein the second cranks are adapted to act upon the holding member such that the holding member is displaced half the distance of the displacement of the interceptor member. The holding member is, e.g. arranged between the interceptor member and the front plate. Further, the holding member could be provided with multiple slots to house a plurality of rollers acting as bearings between the interceptor member and the front plate, wherein the bearings reduce the frictional forces between the interceptor member and the housing.

Thus, the frictional forces acting on the device are reduced, and a smoother movement of the interceptor member is achieved.

In yet another advantageous embodiment of the inventive device, the at least two actuators of the device are electric actuators. Electric actuators can be fitted within the housing of the device, wherein no additional grooves/slots/holes are required on the boat hull. The device is possible to use with other art of actuators such as hydraulic or pneumatic actuators, electric actuators are however preferred.

The device is applicable for dynamically controlling the trim, running pitch, roll and/or steering of boats, ships or vessels, e.g. any vessel, or watercrafts.

The present disclosure also discloses a boat, ship or vessel, wherein the boat, ship or vessel comprises, for example, is provided with a device as described herein.

BRIEF DESCRIPTION OF THE DRAWINGS

In the following section, the disclosure will be described in a greater detail with reference to embodiments shown by the enclosed figures. It should be emphasised that the embodiments shown are used as examples only and are in no way intended to limit the scope of the disclosure.

FIG. 1 illustrates a first view of an embodiment of an assembled device, in accordance with the present disclosure, for the dynamic controlling pitch, roll and/or steering of a boat, ship or vessel;

FIG. 2 illustrates a second view of an assembled device;

FIG. 4 illustrates a retracted position of the device;

FIG. 5 illustrates an extracted position of the device;

DETAILED DESCRIPTION

Figure 3:
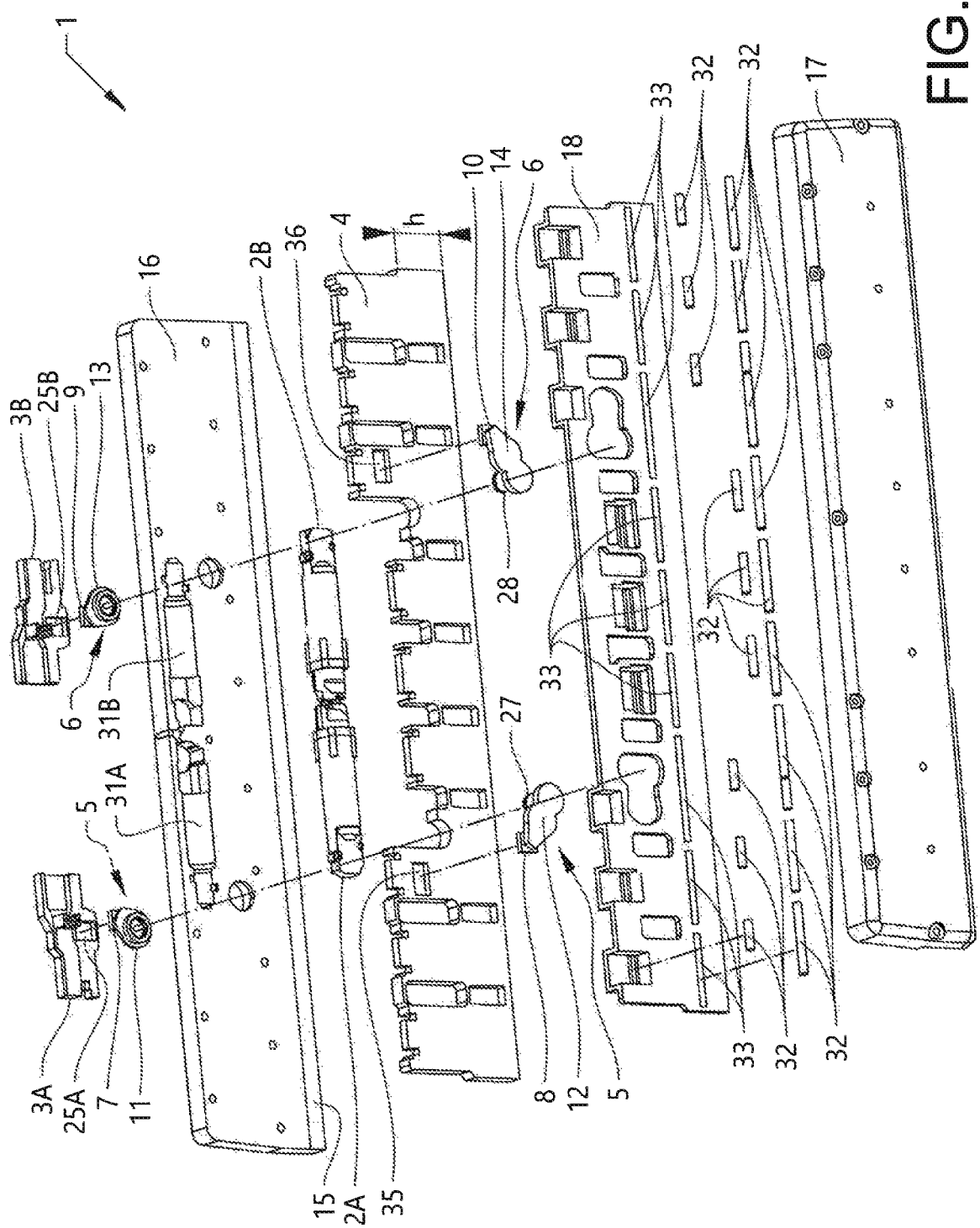
FIG. 3 illustrates an exploded and perspective view of a device for the dynamic controlling pitch, roll and/or steering of a boat, ship or vessel.

FIG. 1 illustrates a first view of an exemplary embodiment of an assembled device 1 according to the disclosure and FIG. 2 illustrates a second view of the assembled device 1, and FIG. 3 illustrates an exploded and perspective view of the device 1 used for dynamically controlling the running pitch, roll and/or steering of a boat, in accordance with the present disclosure. The device 1 comprises two actuators 2A and 2B, two actuating means 3A and 3B, and an interceptor member 4. As will be evident to a person ordinarily skilled in the art, the actuators 2A and 2B can be of any type known in the art. Some examples of such actuators are an electric, pneumatic or hydraulic or a combustion driven actuator. However suitable embodiments comprise electric actuators which is also shown. The actuators 2A and 2B are adapted to be arranged in preformed slots 31A and 31B provided in the back plate 16.

The device 1 further comprises a first crankshaft 5 and a second crankshaft 6. The first crankshaft 5 includes a centre shaft 27, a first crank 11 and a second crank 12. The first crank 11 is provided at a first end of the centre shaft 27 and the second crank 12 is provided at the second end of the centre shaft 27. The first crankshaft 5 is provided with a first sliding shoe 7 that is attached to the first crank 11 and a second sliding shoe 8 that is attached to the second crank 12.

Similarly, the second crankshaft 6 includes a centre shaft 28, a first crank 13 and a second crank 14. The first crank 13 is provided at a first end of the centre shaft 28 and the second crank 14 is attached at the second end of the centre shaft 28. Further, the second crankshaft 6 is provided with a first sliding shoe 9 that is attached to the first crank 13 and a second sliding shoe 10 that is attached to the second crank 14.

The first and the second crankshaft 5, 6 are each operably coupled to the corresponding actuating means 3A and 3B, respectively, and which together forms transmission means 30A and 30B (transmission means 30A is shown in FIGS. 6, 7, 8 and 9, note that transmission means 30B which is not shown here will work in a corresponding way) at which actuator 2A and 2B act. Further, the transmission means 30A and 30B are operably connected to the interceptor member 4 over the sliding shoes 8 and 10 provided on respective second cranks 12 and 14 to act thereon.

The device 1 also comprises a back plate 16, at which the components of the transmission means 30A and 30B are provided. A holding member 18 and a front plate 17 are also provided, wherein the front plate 17 forms a housing of the device 1 together with the back plate 16. In the shown embodiment of the disclosure, a lip 15 is provided at the bottom edge of the back plate 16. The lip 15 extends perpendicularly to the displacement of the interceptor member 4. The lip 15 is adapted to seal between the back plate 16 and the interceptor member 4, to protect the device 1 from high pressure water and to act as a scraper to remove dirt and/or marine growth. As will be evident to a person ordinarily skilled in the art, the lip 15 can be made up of any suitable material. The back plate 16 is also provided with a number of pre-drilled holes to conveniently attach the housing of the device 1 to the hull of the boat.

The device 1 has a length l in the length direction L which is approximately the length of the interceptor member 4 in the length direction L. This is enabled since no guiding means is needed to provide the linear displacement. Further the device 1 has a height in the height direction H the device. Moreover, the device is compact, because the actuators are provided inside the device 1 and no extending guiding means, as in some prior art, is needed, due to the inventive transmission means 30A and 30B.

The second cranks 12 and 14 interact with the interceptor member on essentially the same height h and symmetrically arranged about the interceptor members centreline c going in the height direction, i.e. each arranged half the distance d from the centreline c. Forces occurring from the second cranks 12 and 14 in the length direction of the device cancel thereby each other out, wherein a linear displacement is enabled without any guiding means and here with two actuators 2A and 2B. Because the forces, in the length direction of the device, from the first and the second crankshafts 5 and 6 are directed in opposite directions relative each other and are essentially equally large, these will cancel each other out.

Rollers 32 are provided between the interceptor member 4 and the front plate 17 and between the interceptor member 4 and the back plate 16. The rollers decrease the friction between the parts they are placed between. The rollers between the interceptor member 4 and the front plate 17 are arranged in slots 33 in the holding member 18. Wherein the holding member 18 is displaced half the distance of the interceptor member 4 during a retraction and extraction, wherein a "perfect roller rolling motion" is achieved, see FIG. 5.

FIG. 4 illustrates the device 1 having the interceptor member 4 in a retracted position and FIG. 5 illustrates the device 1 having the interceptor member 4 in an extracted position. The front plate 17 is removed from FIGS. 4 and 5 in order to expose the interior of the device 1. In FIG. 5 is a part of the interceptor member 4 and the holding member 18 cut out.

Figure 6:
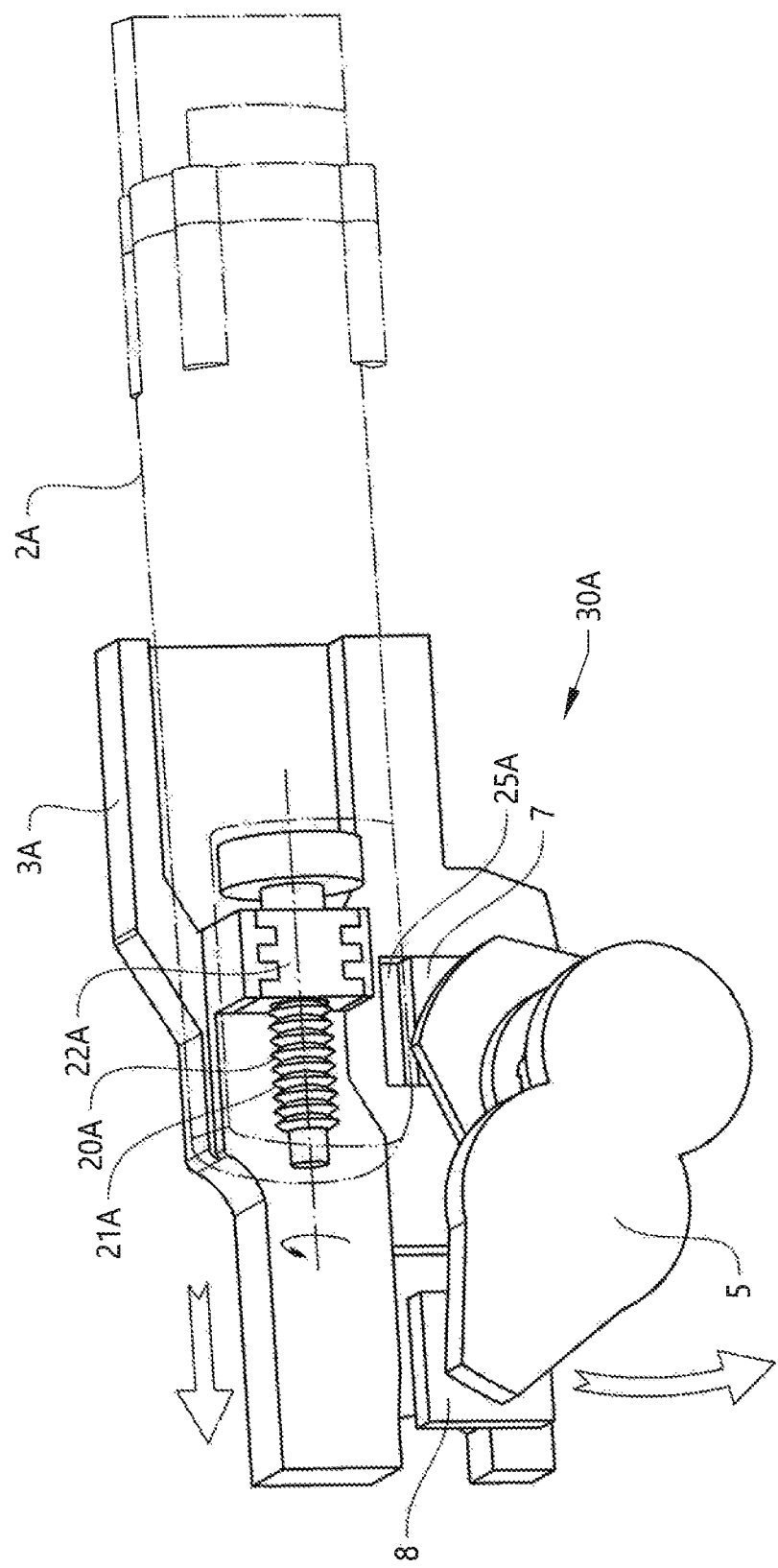
FIG. 6 illustrates one of the transmission means from a front view in a retracted position of the device.
Figure 7:
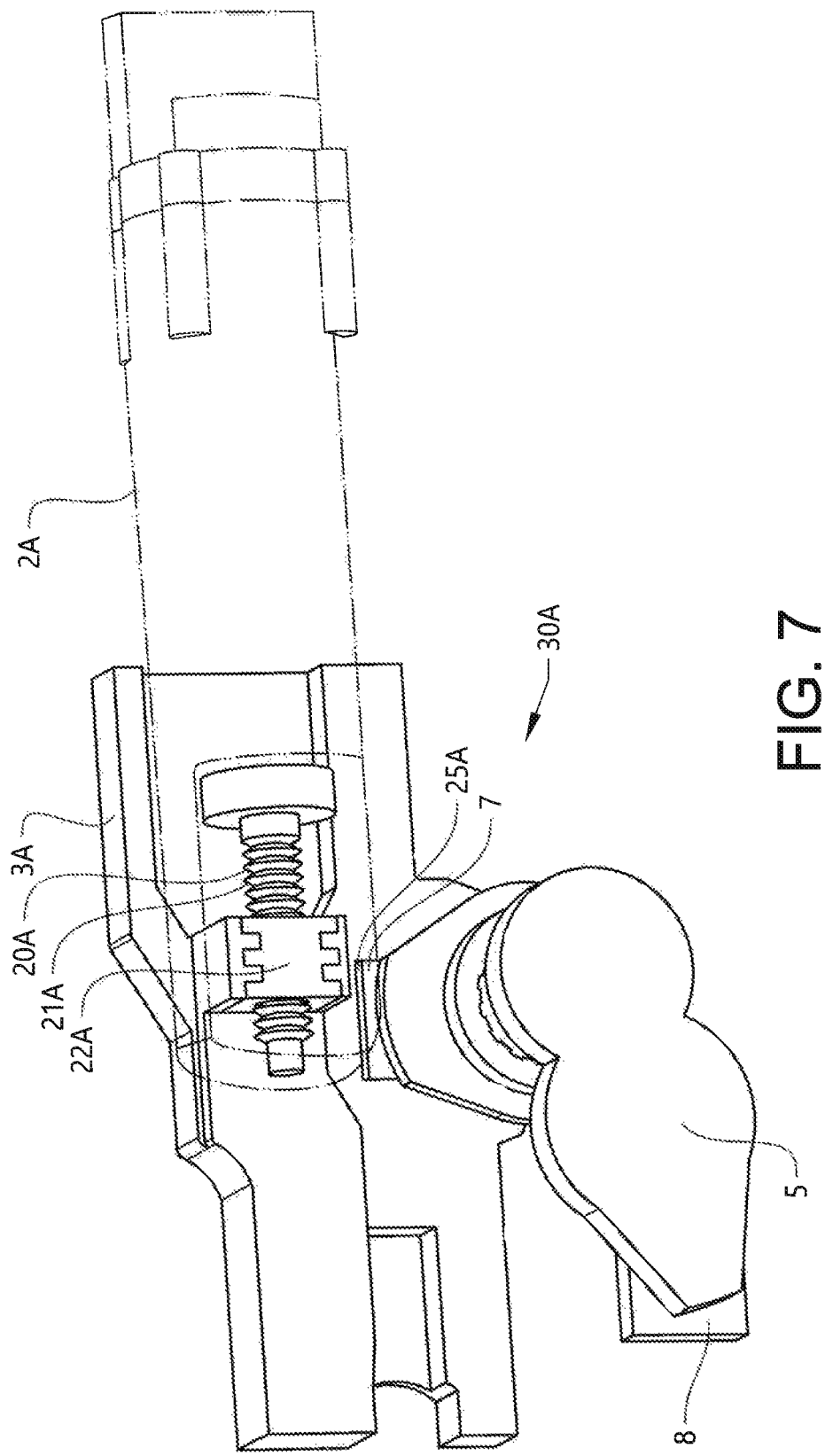
FIG. 7 illustrates the same transmission means from a front view, as in FIG. 6, but in an extracted position of the device.
Figure 8:
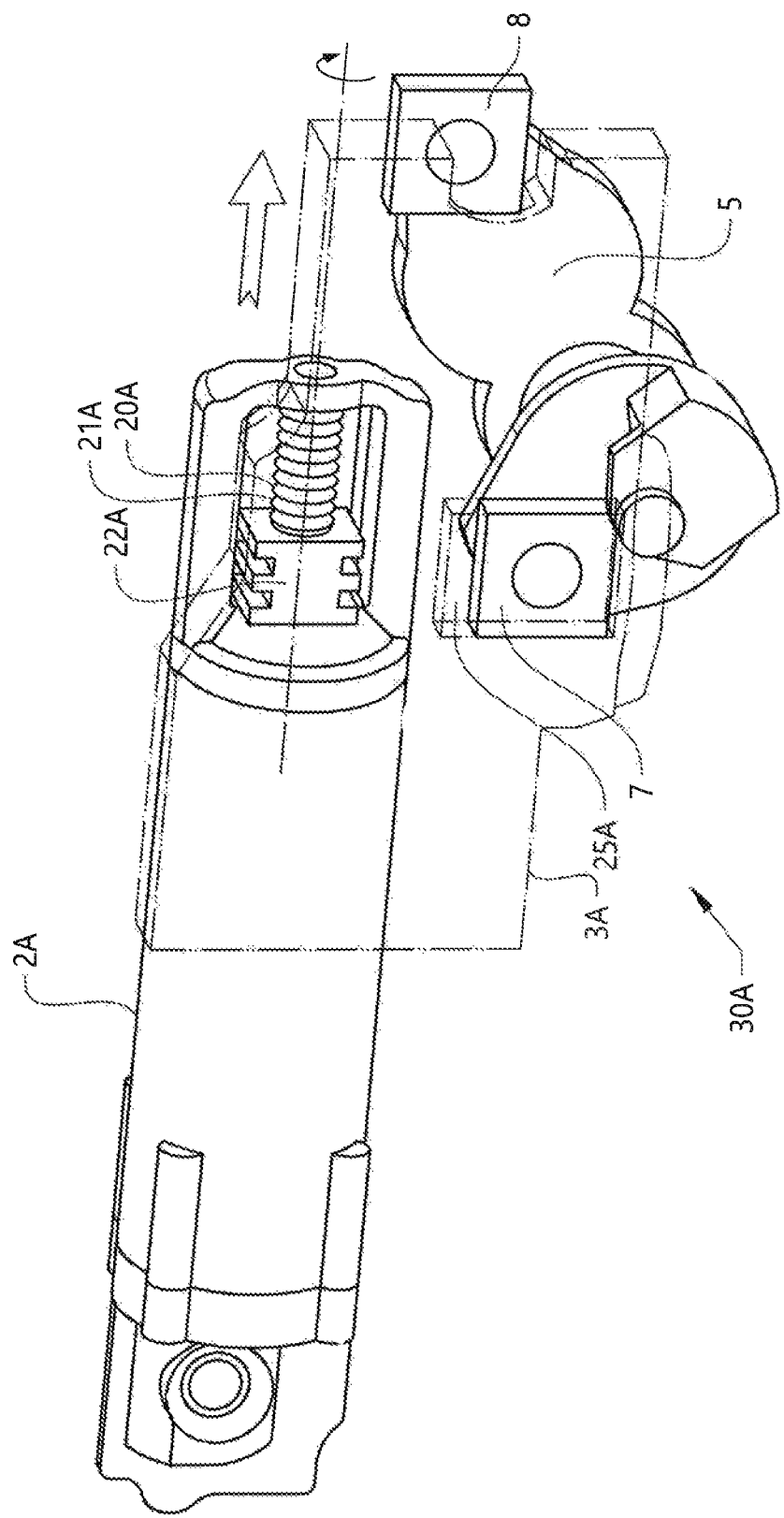
FIG. 8 illustrates the same transmission means and in the same position, as in FIG. 6, i.e. in a retracted position of the device, but from a back view.
Figure 9:
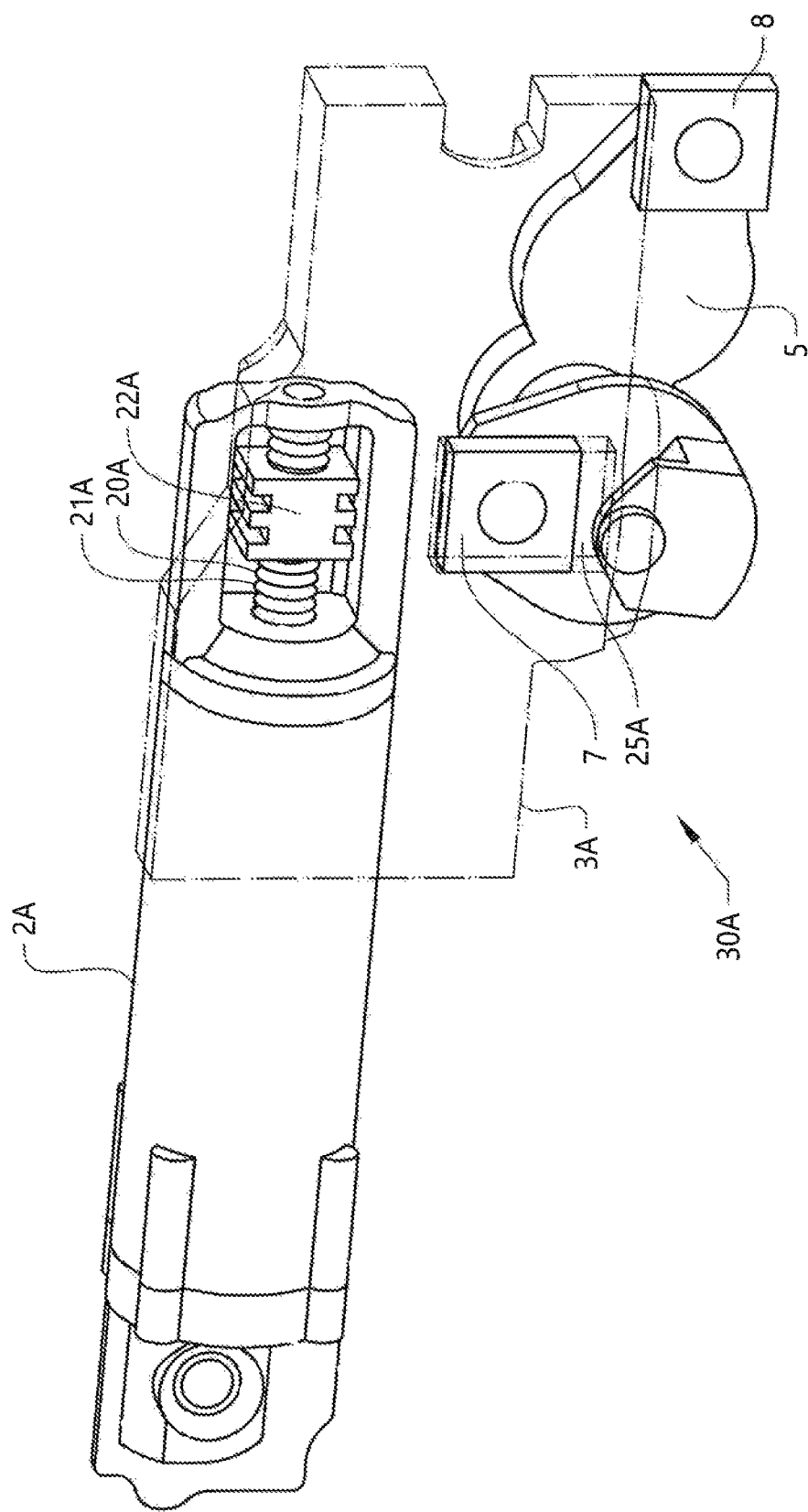
FIG. 9 illustrates the same transmission means and in the same position, as in FIG. 7, i.e. in an extracted position of the device, but from a back view.

FIG. 6 (front view) and 8 (back view) illustrate the transmission means 30A of the device 1 in a position corresponding to the retracted position of the device shown in FIG. 4. Further, FIG. 7 (front view) and 9 (back view) illustrate the transmission means 30A of the device 1 in a position corresponding to the extracted position of the device shown in FIG. 5. Note again that transmission means 30B which is not shown here will work in a corresponding way. The actuator 2A is just marked with outlines in FIGS. 6, 7, 8 and 9 in order to show otherwise thereby hidden features. FIGS. 7 and 9 illustrate the transmission means 30A of the device 1 in a position corresponding to the extracted position of the device shown in FIG. 5.

Figure 10:
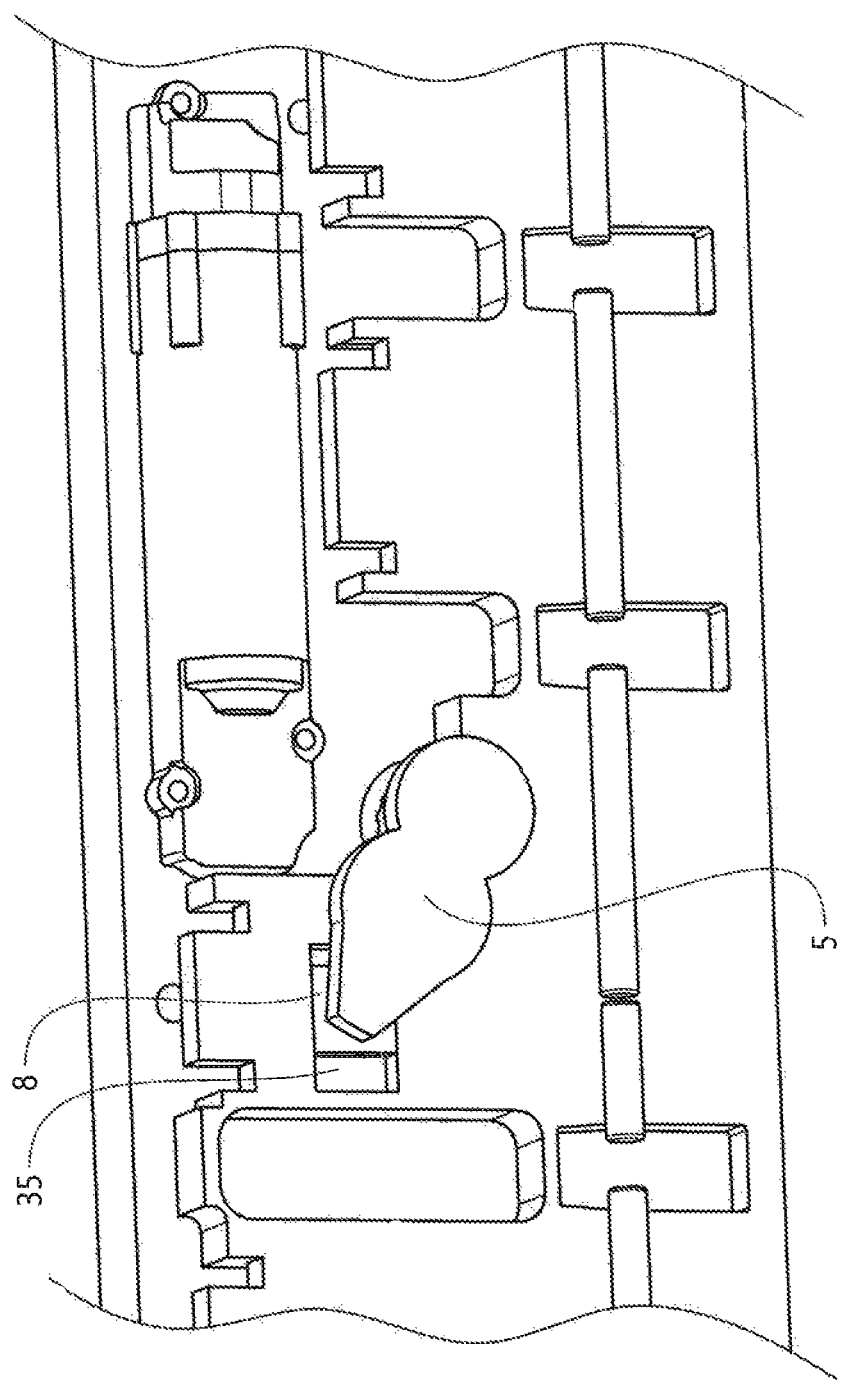
FIG. 10 illustrates the same transmission means, in the same position and from a front view, as in FIG. 6, but with a cut out, of both, the interceptor and back plate shown A person skilled in the art will readily appreciate that various features disclosed in the description may be modified, and that various embodiments disclosed and/or claimed may be combined without departing from the scope of the disclosure.

FIG. 10 discloses a cut out of the interceptor member 4 in a retracted position.

Now the function of the device 1 will be described in conjunction with the FIGS. 3-10. As described above, the actuators 2A and 2B are operably connected with the corresponding actuating means 3A and 3B. Further, the actuator 2A and 2B each comprises a shaft portion that is designed as a lead screw 20A and lead screw 20B, respectively. Note that none of the actuator 2B, the corresponding actuating means 3B nor the lead screw 20B is shown in any of FIGS. 4-10, but they will work in a corresponding way as all the shown actuator 2A, actuating means 3A and lead screw 20A. The lead screw 20A has a continuous thread 21A and the actuating means 3A has a complimentary threaded section 22A which facilitates the connection of the actuating means 3A to the actuator 2A.

Further, note that herein described arrangements with lead screw and complimentary threaded section are only exemplified embodiments. Any suitable "transmission solution" may be used in embodiments of the present disclosure.

Herein the actuators 2A and 2B are placed with their length directions essentially perpendicular to the displacement direction of the interceptor member. However, the actuators 2A and 2B may, in further embodiments, be placed with their length directions in other directions, e.g. not perpendicular to the displacement direction of the interceptor member. Further, force transmission from the actuators 2A and 2B may be direct, or by any suitable transmission construction, comprising, for example, threads, e.g. gears, for example, friction gears and/or worm gears.

Further, the first crankshaft 5 and the second crankshaft 6 are connected with the actuating means 3A and 3B, respectively, by a first preformed groove 25A and a second preformed groove 25B, respectively, which are provided in the actuating means 3A and 3B, respectively. The first preformed groove 25A is adapted to receive the first sliding shoe 7 of the first crankshaft 5 and the second preformed groove 25B is adapted to receive the first sliding shoe 9 of the second crankshaft 6. The first and the second groove 25A, 25B in the actuating means 3A and 3B, respectively are arranged such that the first sliding shoes 7, 9 can slide perpendicular to the movement of the actuating means 3A and 3B, respectively.

Further, a first and a second groove 35, 36 are provided on the interceptor member 4, the first and second groove 35, 36 in the interceptor member 4 are adapted to receive the second sliding shoes 8, 10. The grooves 35, 36 in the interceptor member 4 are shown in FIG. 3, and are arranged perpendicular to the first and second groove 25A, 25B in the actuating means 3A and 3B, respectively, such that the second sliding shoes 8, 10 can slide therein.

With the above described arrangement of the sliding shoes 7, 9, 8, 10 in their corresponding grooves 25A, 25B, 35, 36 the swinging motion of the cranks 11, 13, 12, 14 can be compensated, in that that they slide in the grooves 25A, 25B, 35, 36.

In operation, whenever the actuator 2A and 2B act upon the actuating means 3A and 3B, respectively, the actuating means 3A and 3B, respectively, move in a first direction that is parallel to the length direction of the device 1. This movements are realised using the lead screw 20A and lead screw 20B, as described above. Further, the actuating means 3A and 3B which are operable connected with the interceptor member 4 displace the interceptor member 4 in a second direction which is perpendicular to the first direction of displacement of the actuating means 3A and 3B.

As described above, the first crankshaft 5 and the second crankshaft 6 are operably connected to the actuating means 3A and 3B, respectively. This arrangement is made in such a manner that the first crankshaft 5 and the second crankshaft 6 acts on essentially the same heights upon the actuating means 3A and 3B, respectively. Further, the second cranks 12, 14 of respective crankshaft 5, 6 act upon the interceptor member 4 on essentially the same height h (shown in FIG. 3), i.e. same distance from the lower edge of the interceptor member 4.

Essentially the same height is defined such that the lowest part of the highest positioned sliding shoe never is above the highest part of the lowest positioned sliding shoe. For the side force cancellation, it is optimal that the first and second cam shaft interacts with the interceptor member on exactly the same height. However, essentially (as defined above) the same height is enough to achieve the desired effect to avoid using guiding means.

Further, whenever the actuating means 3A and 3B are displaced the movements causes the first crankshaft 5 and the second crankshaft 6 to rotate in an opposite direction relative to each other. As the pair of first sliding shoes 7, 9, slide in the preformed grooves 25A, 25B, the crankshafts 5, 6 rotate in opposite directions relative to each other, whereby, the second sliding shoes 8, 10 of the first and second crankshafts 5, 6 slide in their respective groove 35, 36 (see FIGS. 3, 4 and 5) in the interceptor member 4 and act thereupon, such that the interceptor member 4 is displaced.

The second cranks 12, 14 interact additionally upon the holding member 18, such that the holding member 18 is displaced half the distance of the interceptor member 4 during a retraction or extraction of the interceptor member 4. Corresponding grooves therefore are provided in the holding member 18.

Further, whenever it is desirable to retract the interceptor member 4, the actuators 2A and 2B can be operated in a reverse direction.

The device 1 of the present disclosure is primarily used for controlling the running pitch, roll and/or steering of a boat. As mentioned above, the device 1 is operated suitably to gain the desired effect of pitch and roll control of the boat. Further, the device 1 is used to control the steering of the boat to change the heading of the boat and/or heeling when turning.

Moreover, the device 1 is adapted to be used with a mono hull boat or with a boat with multiple hulls. The device 1 can be connected to and controlled from a control system of any previously known type. For example, the control system can be a PLC/computer-based system present on board a boat or vessel.

Reference signs mentioned in the claims should not be seen as limiting the extent of the matter protected by the claims, and their sole function is to make claims easier to understand.

As will be realised, the device is capable of modification in various obvious respects, all without departing from the scope of the appended claims. Accordingly, the drawings and the description thereto are to be regarded as illustrative in nature, and not restrictive.

When the device is utilised primarily for dynamic control of pitch, i.e. longitudinal running trim, of a boat, one single device or several cooperating devices can be used. In this case the device or the cooperating devices is/are activated to the degree necessary in order to achieve the desired running trim of the boat, e.g. in order to avoid the bow of the running boat rises to high.

When the device instead is utilised primarily for dynamic control of roll, i.e. transversal trim (i.e. list) of a boat, a pair of devices are suitably used. Thereby, one of the devices according to the disclosure is attached close to the starboard end of the stern, while the other device is attached close to the port end of the stern. In this case, the pair of devices is activated in an individual manner, i.e. the device at the end of the stern of the running boat which is closer to the water surface is activated to a higher degree than the device attached to the opposite end of the stern. However, exemplary embodiments of the are also conceivable with more than two devices utilised for the above-described control strategy.

If the two above described strategies are combined, dynamic control of both pitch and roll of a running boat can be achieved by means of the device/devices.

The invention claimed is:

1. A device for controlling pitch, roll and/or steering of a boat, ship or vessel, the device having a length direction and a height direction and comprising:
    at least two actuators;
    at least two actuating means;
    at least two crankshafts; and
    an interceptor member,
    wherein each of the at least two actuators is adapted to interact with a corresponding actuating means of the at least two actuating means,
    wherein the at least two actuating means are adapted to interact with the interceptor member, such that the interceptor member is linearly displaceable between a retracted and an extracted position,
    wherein each of the at least two actuating means is adapted to interact with a corresponding crankshaft of the at least two crankshafts, which thereby rotates,
    wherein the at least two crankshafts interact with the interceptor member such that rotations of the at least two crankshafts consequently lead to a displacement of the interceptor member between the retracted and the extracted position, and
    wherein the at least two actuating means have a linear movement which are directed perpendicular relative the movement of the interceptor member and opposite directed relative each other.

2. The device according to claim 1, wherein the at least two actuating means and the at least two crankshafts are arranged so that a translational motion of each of the at least two actuating means is transferred to a rotary motion of the corresponding crankshaft of the at least two crankshafts.

3. The device according to claim 2, wherein the device comprises an even number of the at least two actuating means and of the at least two crankshafts, and wherein a first half of the at least two crankshafts, and a second half of that at least two crankshafts, are arranged such relative each other that they rotate in opposite directions when a corresponding actuating means of the at least two actuating means act thereon.

4. The device according to claim 2, wherein the motion of each of the at least two actuating means is essentially perpendicular to the motion the interceptor member.

5. The device according to claim 2, wherein the device comprises an even number of the at least two actuators, the at least two actuating means and the at least two crankshafts, and wherein a second half of the at least two actuator means, are mirrored placed to a first half of the at least two actuators means.

6. The device according to claim 1, wherein the device comprises an even number of the at least two actuating means and of the at least two crankshafts, and wherein a first half of the at least two crankshafts, and a second half of the at least two crankshafts, are arranged relative each other such that they rotate in opposite directions when the corresponding actuating means of the at least two actuating means act thereon.

7. The device according to claim 6, wherein the motion of each of the at least two actuating means is essentially perpendicular to the motion the interceptor member.

8. The device according to claim 6, wherein the device comprises an even number of the at least two actuators, the at least two actuating means and the at least two crankshafts, and wherein a second half of the at least two actuator means, are mirrored placed to a first half of the at least two actuators means.

9. The device according to claim 1, wherein the motion of each of the at least two actuating means is essentially perpendicular to the motion of the interceptor member.

10. The device according to claim 9, wherein the device comprises an even number of the at least two actuators, the at least two actuating means and the at least two crankshafts, and wherein a second half of the at least two actuator means, are mirrored placed to a first half of the at least two actuators means.

11. The device according to claim 1, wherein the device comprises an even number of the at least two actuators, the at least two actuating means and the at least two crankshafts, and wherein a second half of the at least two actuator means, are mirrored placed to a first half of the at least two actuators means.

12. The device according to claim 1, wherein the device comprises an even number of the at least two actuating means and the at least two crankshafts, and wherein a second half of the at least two actuators is either rotated 180°, or mirrored placed, to a first half of the at least two actuators, and a second half of the at least two actuating means is mirrored placed to a first half of the at least two actuating means, and the at least two crankshafts thereby rotate in opposite directions to each other when acted on by the corresponding actuating means of the at least two actuating means.

13. The device according to claim 1, wherein the device comprises an even number of the at least two actuating means and the at least two crankshafts, and wherein a second half of the at least two actuators is rotated 180° to a first half of the at least two actuators.

14. The device according to claim 1, wherein the device comprises two of the at least two actuators, the at least two actuating means and the at least two crankshafts, and wherein the second of the two actuators is rotated 180° to the first of the two actuators and wherein the second actuator is similar to, for example, substantially identical to the first actuator.

15. The device according to claim 1, wherein the device comprises an even number of the at least two actuating means and the at least two crankshafts, and wherein a first half of the at least two actuators is arranged essentially symmetrically to a second half of the at least two actuators.

16. The device according to claim 1, wherein the device comprises means for limiting friction between the interceptor and a holding member.

17. The device according to claim 1, wherein the device comprises rollers that are arranged in-between, and to act as bearings between the interceptor member and a holding member.

18. The device according to claim 1, wherein the device is provided with sliding surfaces between the actuating means and a back housing part or a front housing part.

19. The device according to claim 1, wherein the at least two actuators are electric actuators.

20. A boat, ship or vessel, wherein the boat, ship or vessel comprises, the device according to claim 1.

\* \* \* \* \*